(12) United States Patent
Pus

(10) Patent No.: US 8,923,300 B2
(45) Date of Patent: Dec. 30, 2014

(54) CONNECTION FOR THE FAST ANALYSIS OF PACKET HEADERS TRANSFERRED VIA DATA BUS

(71) Applicant: Cesnet, Zajmove Sdruzeni Pravnickych Osob, Prague (CZ)

(72) Inventor: Viktor Pus, Kurim (CZ)

(73) Assignee: Cesnet, Zajmove Sdruzeni Pravinickych Osob, Prague (CZ)

( * ) Notice: Subject to any disclaimer, the term of this patent is extended or adjusted under 35 U.S.C. 154(b) by 155 days.

(21) Appl. No.: 13/855,792

(22) Filed: Apr. 3, 2013

(65) Prior Publication Data
US 2013/0272307 A1 Oct. 17, 2013

(30) Foreign Application Priority Data

Apr. 17, 2012 (CZ) ..................................... 2012-264

(51) Int. Cl.
| | |
|---|---|
| *H04L 12/28* | (2006.01) |
| *H04L 12/56* | (2006.01) |
| *H04L 12/741* | (2013.01) |
| *H04L 29/06* | (2006.01) |
| *H04L 12/40* | (2006.01) |
| *H04L 12/26* | (2006.01) |

(52) U.S. Cl.
CPC ................ *H04L 45/74* (2013.01); *H04L 69/22* (2013.01); *H04L 12/40* (2013.01); *H04L 43/18* (2013.01)
USPC ....................................................... 370/392

(58) Field of Classification Search
None
See application file for complete search history.

(56) References Cited

U.S. PATENT DOCUMENTS

| | | | |
|---|---|---|---|
| 2004/0184457 A1* | 9/2004 | Gregorio et al. ............... | 370/392 |
| 2011/0268123 A1* | 11/2011 | Kopelman et al. ............ | 370/392 |

FOREIGN PATENT DOCUMENTS

| | | |
|---|---|---|
| WO | WO 01/10096 A2 | 2/2001 |
| WO | WO 2008/009994 A1 | 1/2008 |
| WO | WO 2009/013067 A2 | 1/2009 |

OTHER PUBLICATIONS

Czech Republic Search Report dated Apr. 17, 2012.
Kobiersky et al., "Packet Header Analysis and Field Extraction for Multigigabit Networks" Design and Diagnositcs of Electronic Circuit & Systems, 978-1-4244-3339-1/09 2009, IEEE, 12th International Symposium, str. 96-101, Apr. 15, 2009.

* cited by examiner

*Primary Examiner* — Edan Orgad
*Assistant Examiner* — Rebecca Song
(74) *Attorney, Agent, or Firm* — Buchanan Ingersoll & Rooney PC

(57) ABSTRACT

A connection for the fast analysis of packet headers by a circuit connected directly to the data bus, which transfers the packets. This circuit contains sub-circuits for the protocols headers analysis. Furthermore, the circuit contains a counter, which informs the sub-circuits about the data bus status. Each of the sub-circuits is equipped with the data input from the data bus, the input of the counter, the activating input, which determines the presence of the given protocol header in the packet, and with the input of the position of the header start in the packet. Further, each of the sub-circuits is equipped with a set of activating outputs, which determine the type of the next protocol header, and with the output of the position of the next header start. All sub-circuits, using the auxiliary logic circuits and multiplexers, are connected in the structure, which corresponds to the number and structure of the anticipated protocols in the packet. Chain thus created from sub-circuits is then in the same manner divided into branches based on the anticipated number of protocols, the headers of which are to be analyzed.

2 Claims, 2 Drawing Sheets

CONNECTION FOR THE FAST ANALYSIS OF PACKET HEADERS TRANSFERRED VIA DATA BUS

BACKGROUND OF THE INVENTION

The presented solution deals with the processing of packets in computer networks. The basic information about a packet is stored in its header, which needs to be analyzed prior to the further processing of the packet. Therefore, the solution deals with the sphere of telecommunications technology and services.

DESCRIPTION OF PRIOR ART

Messages in computer networks are encapsulated into several layers of communication protocols. Each such protocol appends to a packet its own header. However, because the headers of some protocols are not of equal length and because the order of the headers in the packet usually is not known in advance, it is generally necessary to process the individual headers of the protocols one by one, while the result of the analysis of one header affects the analysis of the following header.

Current solutions store the packet into the memory and subsequently they analyze the headers. However, due to data subordinations, they include a range of dependent memory accesses where the reading of a certain value from memory is preconditioned by the accomplished the reading of previous value. The shortest possible time of processing all the headers contained in the packet is then given by a product of the time for completing single memory operation and the number of memory operations.

SUMMARY OF THE INVENTION

The disadvantages mentioned above are eliminate by the connection for the fast analysis of the packet headers by a circuit connected directly to the data bus for the packets transfer, according to the presented solution. Its principle is that the data outputs of the data bus are connected both to the chain of the N sub-circuits for protocols headers analysis, the number of which is given by the anticipated number of transferred protocols, and also to the counter, the output of which is interconnected with the inputs of the counter values of the individual sub-circuits. The first sub-circuit, connected to the input in the chain, has an activating input and an input of the position of the header start, the values of which are constant, and its output of the position of the next header start is interconnected both directly with the input of the second sub-circuit and also with one input of all multiplexers, the number of which is given by the number of sub-circuits inserted in the next section of the chain. This first sub-circuit is equipped with activating outputs, the number of which is given by the number of sub-circuits inserted in the next section of the chain. One activating output is connected directly to the activating input of the second sub-circuit and its other activating outputs are connected to one input of the auxiliary logic circuits, the number of which is given by the number of sub-circuits inserted in the next section of the chain. To the second input of each of the auxiliary logic circuits is connected one of the activating outputs of the second sub-circuit. The output of the position of the next header start of the second sub-circuit is connected to the second input of the multiplexers, and to their control inputs are connected the control outputs of the auxiliary logic circuits. Activating outputs of the auxiliary logic circuits are connected to the activating input of the next sub-circuit relevant for them, while to their second input is connected the output of the multiplexer relevant for them. The activating outputs of these successive sub-circuits, the number of which is given by the number of anticipated other types of protocol headers, and the outputs of the position of the next header start are part of the output of the whole circuit. The chain thus created from the sub-circuits is then, in the same manner divided into branches based on the anticipated number of protocols, the headers of which are to be analyzed. The outputs of the whole circuit are then formed by partial activating outputs and the outputs of the position of next header start.

In a preferred embodiment, the described connection is created within the FPGA circuit, which serves to receive, process and send packets.

The advantage of this solution is a faster analysis of the packet headers as opposed to placing a packet into the memory. Several layers of headers may be analyzed in every single clock cycle of the FPGA, because pieces of information transferred between individual sub-circuits are very simple. Another advantage is the option to change the supported protocols by changing the circuit structure. The sub-circuits for the individual headers analysis operate independently and have a unified interface, therefore the change of the circuit structure, and hence the change of supported protocols, is not a problem.

EXPLANATION OF THE DRAWINGS

The principle of the new solution is explained below and described using the attached drawing, FIG. 1, which shows the block diagram of the circuit.

DETAILED DESCRIPTION OF THE PREFERRED EMBODIMENTS

Figure 1:
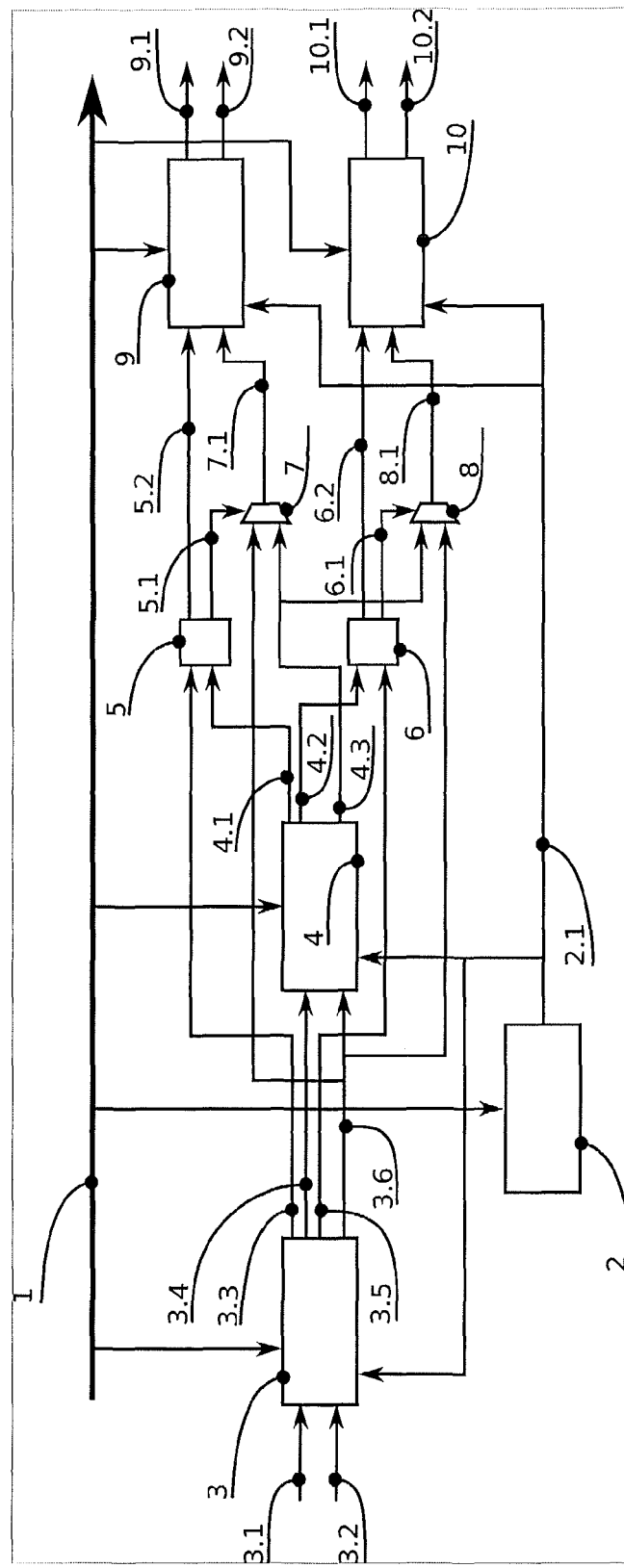

The subject of the new solution, in general, is the use of an analyzing circuit consisting of sub-circuits for analyzing the individual protocols headers and of the data words counter on the data bus, and connected directly to the data bus, which transfers packets. The circuit contains sub-circuits connected into a structure, which corresponds to the individual anticipated protocols headers in the packets. The attached FIG. 1 shows the circuit solution of the whole connection. The presented diagram shows only one specific option for the sub-circuits connection, which is based on a specific set of supported protocols.

In the connection, according to FIG. 1, the data outputs of the data bus 1 are interconnected both with the chain of N sub-circuits, here the sub-circuits 3, 4, 9 and 10, for protocols headers analysis. The number of sub-circuits is given by the anticipated number of transmitted protocols. Another part of the connection is a counter 2, the output 2.1 of which is interconnected with the inputs of the counter values of individual sub-circuits 3, 4, 9 and 10. The first sub-circuit 3, connected to the input in the chain, has an activating input 3.1 and an input 3.2 of the position of the header start, the values of which are constant. The output 3.6 of the position of the next header start of the first sub-circuit 3 is interconnected both directly with the input of the second sub-circuit 4 and also with one input of all multiplexers 7, 8, the number of which is given by the number of sub-circuits inserted in the next section of the chain, here these are the two next sub-circuits 9 and 10. The first sub-circuit 3 is then equipped with activating outputs 3.3, 3.4, 3.5, the number of which is again given by the number of the sub-circuits inserted in the next section of the chain. Here they are three sub-circuits 4, 9, 10. One such activating output 3A is here connected directly to the activating input of the second sub-circuit 4 and its other activating outputs 3.3, 3.5 are connected to one input of the auxiliary logic circuits 5, 6, the number of which is given by the number of sub-circuits inserted in the next section of the chain, here then of the third sub-circuit 9 and the fourth sub-circuit 10. To the second input of each of the auxiliary logic circuits 5, 6 is connected one of the activating outputs 4.1, 4.2 of the second sub-circuit 4, while its output 4.3 of the position of the next header start is connected to the second input of the multiplexers 7, 8. The control inputs of the multiplexers 7 and 8 are connected to the control outputs 5.1, 6.1 of the auxiliary logic circuits 5, 6. The activating outputs 5.2, 6.2 of the auxiliary logic circuits 5, 6 are connected to the activating input of the next sub-circuit 9, or 10 respectively, relevant for them, while to their second input is connected the output 7.1, 8.1 of the multiplexer 7, or 8 respectively, relevant for them. In the given example the activating outputs 9.1, 10.1 of the third activating circuit 9 and the fourth activating circuit 10 and the outputs 9.2, 10.2 of the position of the next header start are a part of the output of the whole circuit. The chain thus created and here described consisting of sub-circuits is then in the same manner divided into branches based on the anticipated number of protocols, the headers of which are to be analyzed. The outputs of the whole circuit are then formed by the partial activating outputs 3.3, 3.4, 3.5, 4.1, 4.2, 9.1, 10.1 and the outputs 3.6, 4.3, 9.2, 10.2 of the position of the next header start.

The herewith given example of the preferred embodiment exploits one FPGA circuit for the creation of the data bus and the circuit consisting of individual sub-circuits 3, 4, 9, 10 for the protocol headers analysis.

In general, one can say that the input of each sub-circuit 3, 4, 9, 10 is the activating signal carrying information if it was activated, it means if the relevant header in the packet is present, and the signal of the position of the header starts giving the sub-circuit the information about the position of the header start in the packet. Also, the inputs of each sub-circuit 3, 4, 9, 10 are the signals from the data bus 1 transferring the packets. Another input of each sub-circuit 3, 4, 9, 10 is the value of the counter 2 of the current position in the packet. The outputs of each sub-circuit 3, 4, 9, 10 are the activating signals carrying information about the detected type of the next header in the packet and the signal carrying information about position of the header start in the packet.

Data bus 1 transfers packets. The counter 2 monitors traffic on the data bus 1 and provides at its output 21 to other sub-circuits analyses of headers, here to the sub-circuits 3, 4, 9 and 10, information about the data bus 1 status, in particular about the position in the packet, which is at the given moment visible on the data bus 1.

All sub-circuits 3, 4, 9 and 10 of the header analysis have in their data input the data currently transferred from the data bus 1 and on their input of the counter value they have the output 2.1 of the counter 2. Because the sub-circuit 3 is the first one, it has on its activating input 3.1 and on its input 3.2 positions of the header start of the constant. This first sub-circuit 3 starts working always at the beginning of the packet. In an Ethernet network this is the analyzer of the Ethernet protocol header. Its output is the output 3.6 of the position of the next header start, and the activating outputs 3.3, 3.4, 3.5. This example therefore presumes that, after the header of the first protocol, three different headers of other protocols may follow.

The second sub-circuit 4 has, to its activating input, directly connected the activating output 3.4 of the first sub-circuit 3 and to its input of the position of the header start it has directly connected the output 3.6 of the sub-circuit 3. This example therefore presumes that the header processed by the second sub-circuit 4 may follow in the packet only after the header of the protocol processed by the first sub-circuit 3. The outputs of the second sub-circuit 4 are the output 4.3 of the position of the next header start, and the activating outputs 4.1 and 4.2. This example therefore presumes that, after the header processed by the second sub-circuit 4 two different protocol headers may follow in the packet.

The third sub-circuit 9 has on its activating input, connected the activating output 5.2 of the first auxiliary logic circuit 5, which sets the value of its activating output 5.2 as the logical sum of the activating output 3.3 of the first sub-circuit 3 and the activating output 4.1 of the second sub-circuit 4, and, also on its input, of the position of the header start it has connected the output 71 of the first multiplexer 7. The first multiplexer 7 switches to its output 71 one of the outputs 3.6 and 4.3 of the position of the next header start, based on the control input, which is set by the control output 5.1 of the first auxiliary logic circuit 5, according to which of the sub-circuits 3, 4 activates the third sub-circuit 9. This example therefore presumes that the header of the protocol processed by the third sub-circuit 9 may, in the packet, follow after the headers of protocols processed by the first sub-circuit 3 or the second sub-circuit 4. The output of the third sub-circuit 9 is a set of activating outputs 9.1, which determines the type of the next protocol header, and the output 9.2 of the position of the next header start. Processing of the header following after the header of the protocol processed by the third sub-circuit 9 is not anticipated in this example and therefore the activating output 9.1 and the output 9.2 of the position of the next header start are used as the outputs of the whole circuit.

The fourth sub-circuit 10 has on its activating input connected the activating output 6.2 of the second auxiliary logic circuit 6, which sets the value of its activating output 6.2 as the logical sum of the activating output 3.5 of the first sub-circuit 3 and the activating output 4.2 of the second sub-circuit 4, and also on its input the position of the header start it has connected the output 81 of the second multiplexer 8. The second multiplexer 8 switches to its output 8.1 one of the outputs 3.6 and 4.3 of the position of the next header start, based on the control input, which is set by the control output 6.1 of the second auxiliary logic circuit 6, according to which of the sub-circuits 3, 4 activates the fourth sub-circuit 10. This example therefore presumes that the header of the protocol processed by the fourth sub-circuit 10 may, in the packet, follow after the headers of protocols processed by the first sub-circuit 3 or the second sub-circuit 4. The output of the fourth sub-circuit 10 is a set of activating outputs 10.1, which determines the type of the next protocol header, and the output 10.2 of the position of the next header start. Processing of the header following after the header of the protocol processed by the fourth sub-circuit 10 is not anticipated in this example and therefore the activating output 10.1 and the output 10.2 of the position of the next header start are used as the outputs of the whole circuit.

In summary, one can say that the sub-circuits 3, 4, 9, 10 perform the following functions in particular:
  Calculation of the fields of interest position in the packet by means of summation units, which sum the position of the header start in the packet (the sub-circuit input) with constant positions of the fields of interest in the header.
  Selection of fields of interest transferred on the data bus 1 by means of multiplexers controlled by calculated positions of the fields in the packet.

Storing the fields of interest values to registers, which are controlled by the sub-circuit control logic.

Determination of the next protocol type by comparing the stored values with constants.

Determination of the next protocol header start by means of summation units, which sum the position of the header start of the current protocol (the sub-circuit input) with the size of this header.

Checking of the protocol correctness by means of a dedicated circuit, for instance by calculation of the checksum.

The sub-circuits 3, 4, 9 and 10 send the obtained information to their outputs, from where they are connected to the inputs of the follow-up sub-circuits and also to the output of the whole circuit. The outputs of the whole circuit are the pieces of information obtained in sub-circuits 3, 4, 9, 10, especially the information about the presence of individual protocol headers and about their positions in the packet. This information can be further exploited, e.g. for a change of packet, by modifying some header, or possibly for the easy extraction of individual fields from the headers by means of multiplexers.

Circuit implementation of each sub-circuit 3, 4, 9 and 10 depends on the protocol, which is to be processed by a given sub-circuit. Each sub-circuit contains summation units for calculation of the fields of interest positions in the packet. The input of each summation unit is the information about the position of the given header start in the packet (it means the sub-circuit input) and the constant defining of the position of the field of interest within the header. The value of the constant is based upon specification of the given protocol. The output of each summation unit is the position of the field of interest in the packet. Each sub-circuit further contains multiplexers for the selection of the packet fields of interest from the data bus. To the control inputs of multiplexers are connected the outputs of summation units, to the data inputs of the multiplexers are connected the signals from the data bus carrying the packets. Each sub-circuit also contains registers for capturing the outputs from the multiplexers. The control input of the registers permitting writing to the registers is connected to the sub-circuit control logic. The values of the thus selected and stored fields of interest are brought to the inputs of comparators, which determine the type of the next header.

Provided that the size of the protocol header processed by the given sub-circuit is not constant, the values of the selected fields of interest are brought to the arithmetic unit determining the size of the header. The outputs of the arithmetic unit are the signals carrying information about the size of the header. In the opposite case it means, provided that the header size is constant, the signals carrying information about the size of the header are constant. Each sub-circuit also contains the summation unit determining the start of the next protocol header. One input of the summation unit is connected to the input signals of the sub-circuit carrying information about the position of the relevant header start, the second input of the summation unit is connected to the signals carrying information about the header size.

Provided that the protocol processed by the sub-circuit contains checking information, the values of fields of interest are brought to the checking circuit. Outputs of the checking circuit may be exploited to report errors in the protocol.

The mutual interconnection of the sub-circuits is made according to the following rules.

If it is expected that the header of the protocol processed by the sub-circuit A will be in the packet followed by the header of one of the protocols processed by the sub-circuits B1 . . . Bn, then the output of the sub-circuit A carrying information about the position of next header start is connected to the inputs of the position of the header start of all sub-circuits B1 . . . Bn. activating outputs of the sub-circuit A are then connected to the activating inputs of the sub-circuits B1 . . . Bn in such a way that only that particular one of such sub-circuits, which is designed to process the detected type of protocol, will be activated.

If it is expected that the protocol processed by the sub-circuit A may in the packet follow after one of the protocols processed by the sub-circuits B1 . . . Bn, then the input of the position of the header start of the sub-circuit A is connected from the output of the multiplexer, which is controlled by the activating outputs of the sub-circuits B1 . . . Bn. The activating input of the sub-circuit A is then connected from the logic unit performing the logical sum of the activating outputs of the sub-circuits B1 . . . Bn in such a way that the sub-circuit A is activated when some of the sub-circuits B1 . . . Bn activates it.

Figure 2:
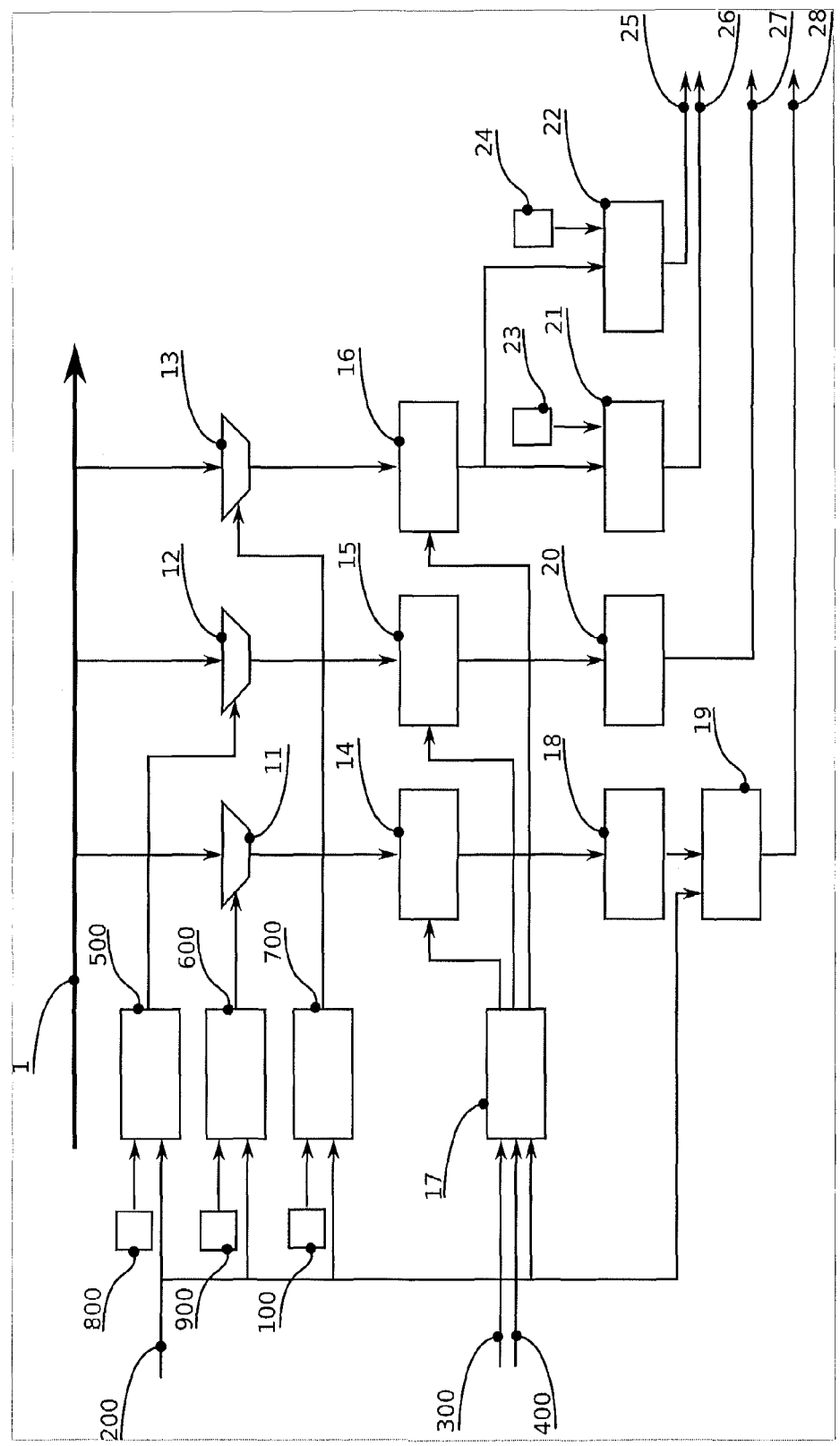
FIG. 2 then shows one of the possible diagrams of the sub-circuit connection.

The attached FIG. 2 shows the circuit solution of a representative sub-circuit 4 for the analysis of the headers of one protocol, which follows after the first sub-circuit 3. The presented example presumes that the length of the analyzed header is not constant, and that it can be calculated from some of the field in the header, further that the analyzed header contains a checking field, which, when used for checking, allows one to verify the protocol correctness, and also that the protocol admits two possibilities of the following protocol types. Data bus 1 transfers packets. One input of the second sub-circuit 4 is in fact the output 3.6 of the position of the next header start of the first sub-circuit 3 and determines the position of the analyzed header in the packet. The second input of the second sub-circuit 4 is the output 2.1 of the counter 2 and identifies the position in the packet, which is currently visible on the data bus 1. The third input of the second sub-circuit 4 forms the activating output 3.4 of the first sub-circuit 3, which determines whether the whole sub-circuit is active. Summation units 500, 600, 700 calculate the positions of the three fields of interest in the packet by summing the position of the analyzed header start on the output 3.6 with the constants 800, 900, 100. The constants 800, 900, 100 are defined by the protocol specification. Multiplexers 11, 12, 13 are controlled by the outputs of the summation units 500, 600, 700 and select from the data bus 1 the fields of interest values. Registers 14, 15, 16 are controlled by the control circuit 17 and store the fields of interest values. Arithmetic unit 18, based on the value of the field of interest stored in the register 14, calculates the length of the header of the processed protocol. The nature of the calculation is given by the protocol specification. The summation unit 19 sums the position of the processed header start from the input 3.6 with the length of the processed header and its output is the output 4.3 of the position of the next header start. Checking circuit 20 checks the correctness of the field of interest value stored in the register 15 and determines the value of the output 27, which indicates an error in the protocol. The nature of the check is given by the protocol specification. Comparators 21 and 22 compare the field of interest value stored in the register 16 with constants 23 and 24 and send the information about the type of the next protocol header to the activating outputs 4.1 and 4.2. Constants 23 and 24 are given by the protocol specification.

INDUSTRIAL APPLICABILITY

Connection for the fast analysis of packet headers by a circuit connected directly to the data bus for the packets transfer according to the presented solution can find industrial applicability in the packet processing circuits. When compared to commonly applied solutions it allows to accelerate the packet headers analysis process, thus contributing to acceleration of the whole system.

The invention claimed is:

1. A connection for fast analysis of packet headers transferred via data bus, comprising:
    a data bus interconnected by data outputs of the data bus with both
        a chain of N individual sub-circuits for analysis of protocols headers, a number of which is given by an anticipated number of transmitted protocols, and
        a counter having an output, said output being interconnected with inputs of counter values of said individual sub-circuits,
    a first sub-circuit of said chain of individual sub-circuits being connected, to the input in the chain of said individual sub-circuits, which has an activating input and an input of the position of the header start, values of which are constant, and by its output of a position of a next header start is interconnected both directly with an input of the second sub-circuit and also with one input of all multiplexers, a number of which is given by a number of said sub-circuits inserted in a next section of the chain, and further comprising activating outputs, a number of which is given by a number of said sub-circuits inserted in a next section of the chain, from which one activating output is connected directly to an activating input of a second sub-circuit and other activating outputs are connected to one input of auxiliary logic circuits, a number of that input which is given by a number of sub-circuits inserted in a next section of the chain, where, to a second input of each of the auxiliary logic circuits, is connected an activating output of the second sub-circuit, while its output of a position of next header start is connected to the second input of the multiplexers, having to their control inputs connected control outputs of the auxiliary logic circuits, and activating outputs of the auxiliary logic circuits are connected to an activating input of next sub-circuit relevant for them, while, to their second input, is connected an output of the multiplexer relevant for them, and their activating outputs, the number of which is given by the number of the anticipated next types of protocol headers, and outputs of a position of the next header start are a part of an output of the whole circuit, while the chain thus created from the sub-circuits is then in the same manner divided into branches based on the anticipated number of protocols, the headers of which are to be analyzed, while the outputs of the whole circuit are formed by the partial activating outputs and outputs of the position of the next header start.

2. The connection according to claim 1 being provided within an FPGA circuit.

* * * * *